Figure 1:
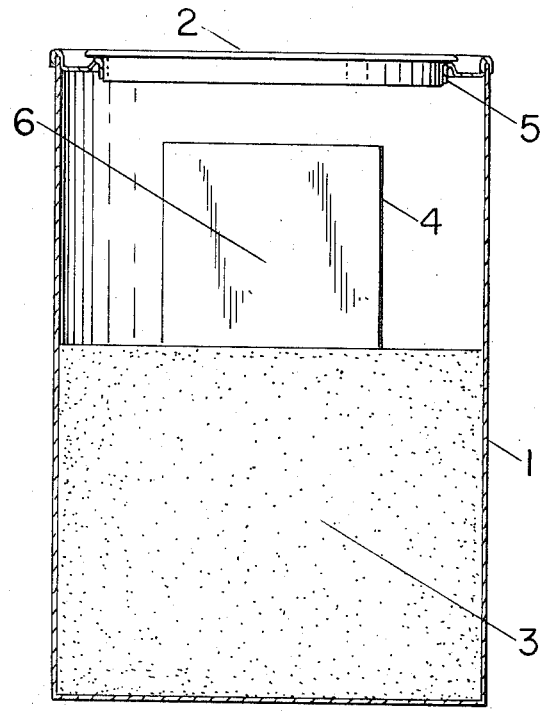

United States Patent [19]
Smith

[11] 3,785,479
[45] Jan. 15, 1974

[54] PLASTER OF PARIS BANDAGES TO MAKE CASTS OF IMPROVED STRENGTH, WATER-RESISTANCE AND PHYSIOLOGICAL PROPERTIES

[76] Inventor: David F. Smith, 660 Longview Dr., Sarasota, Fla. 33577

[22] Filed: Jan. 21, 1972

[21] Appl. No.: 219,888

Related U.S. Application Data

[62] Division of Ser. No. 95,365, Dec. 4, 1970, Pat. No. 3,671,280.

[52] U.S. Cl............... 206/47 A, 206/84, 128/91 R, 106/116
[51] Int. Cl............................................ B65d 81/32
[58] Field of Search................ 206/47 A, 46 R, 0.5, 206/84; 128/90, 91 R; 106/111, 116

[56] References Cited
UNITED STATES PATENTS

| | | | |
|---|---|---|---|
| 2,828,858 | 4/1958 | Tooke | 206/47 A |
| 2,864,492 | 12/1958 | Lappala | 206/47 A |
| 3,375,822 | 4/1968 | Rose | 206/47 A |
| 3,186,869 | 6/1965 | Friedman | 206/0.5 |
| 3,580,390 | 5/1971 | Shull, Jr. | 206/46 R |

*Primary Examiner*—William T. Dixson, Jr.

[57] ABSTRACT

Minor additions of polyvinyl pyrrolidone and melamine-formaldehyde resins to plaster of Paris bandages permit making casts of improved strength and water-resistance with good physiological properties.

5 Claims, 2 Drawing Figures

PATENTED JAN 15 1974 3,785,479

PLASTER OF PARIS BANDAGES TO MAKE CASTS OF IMPROVED STRENGTH, WATER-RESISTANCE AND PHYSIOLOGICAL PROPERTIES

This application is a Division of application Ser. No. 95,365 filed Dec. 4, 1970 now U.S. Pat. No. 3,671,280.

In my copending application entitled "Plaster of Paris Bandages to Make Water-Resistant Casts" Ser. No. 65,732 filed Aug. 20, 1970, of which this application is a continuation-in-part, I have disclosed the use of polyvinyl pyrrolidone in plaster of Paris bandages to improve the water-resistance of casts made therefrom. I have now discovered practical and economical means of further improving the properties of casts not only in respect of strength and water-resistance but also in physiological acceptability. It has been known (see U.S. Pat. Nos. 2,842,120 by Foglia, Smith and Detwiler and 2,842,138 by Billings, Brickman and Eberl) that certain melamine-formaldehyde (triazene-aldehyde) resins (see U.S. Pat. Nos. 2,260,239 by Talbot and 2,310,004 by Widmer et al) can be used to greatly increase strength and water-resistance of casts. However, use of such casts is subject to irritating and/or allergic reactions on the skin of both patients and cast-room personnel. Some persons are sensitive to the traces of formaldehyde always present in uncured such resins, or if not initially they may become sensitized by repeated use of the product. Furthermore, there is another type of reaction even more serious, that sometimes develops on the hands of the surgeon or cast-room technician who uses the product repeatedly— a reaction that may be related to the amino groups in the resin. In spite of the very desirable strength and water-resistant properties of such casts, these reactions have markedly restricted their use. It may be further pointed out that recently plaster of Paris bandages have been used to make an interesting and extensive variety of art objects. Since such items are sometimes highly valued and may be kept or sold as of more or less permanent value, it is highly desirable that such objects have great strength, permanence and resistance to moisture and deteriorating action of molds and other organisms— that this type of cast gives. While my first-mentioned disclosure shows water-resistant casts, I have now been able to improve on my earlier results in respect to strength and water-resistance and at the same time ameliorate any problems due to irritative or allergenic properties. As is well recognized by allergists and dermatologists, there are certain individuals that are sensitive or may be sensitized to a wide variety of even apparently inocuous materials, so that one does not claim to completely eliminate allergic or other skin reactions from all individuals, but herein are disclosed means of greatly reducing such problems as may exist in the use of these casts.

Specific embodiments of my invention will be illustrated in the following Examples and certain modifications and extensions will be described hereinafter while others will be evident to those skilled in the art. All proportions are by weight unless otherwise noted.

EXAMPLE 1.

81 parts of high-density, low-consistency (see U.S.-Gypsum Co. bulletin I.G.L. no. 19 for methods of testing plaster) plaster of Paris (alpha gypsum and sometimes herein designated pop) made by steam-calcining gypsum (see U.S. Pat. No. 1,901,051, issued March 14, 1933 to Randel and Dailey) is slurried in 36 parts of a liquid comprising 80 percent toluene and 20 percent monomethyl ether of ethylene glycol in which is mixed 10 parts uncured melamine-formaldehyde resin prepared with a mol ratio of melamine to formaldehyde of 1:2, and 10 parts of dry polyvinyl pyrrolidone (sometimes designated herein as pvp) of average molecular weight 40,000. To the slurry was then added 0.4 part powdered potassium sulfate, 1.06 parts powdered potassium chloride, 1 part powdered ammonium sulfate and 1 part water-insoluble polyvinyl acetate (as used in U.S. Pat. No. 2,655,148). The mix was well stirred until all soluble materials were dissolved and the resin softened. The resulting slurry was then coated on 32×28 mesh surgical gauze to form a discontinuous coating and dried at 200° to 230°F. for 10 minutes to yield a dry product weighing 210 to 240 grams per 5 square feet. The product was slit into 4 inch by 5 yard strips, rolled into a bandage and packaged in aluminum foil or polyethylidene (Saran) sheet in order to protect it from atmospheric moisture. When tested by the methods of Federal Specification GG–B–101d, the bandage showed a setting-time of five minutes and low loss of plaster both dry and when wet and squeezed out to make a cast. A cast made from a 4×5 bandage gave a strength about 200 lbs. greater than an ordinary cast after 1 day's drying and broke as a unit exhibiting a structure in which plaster is bonded to itself and to the backing, in contrast to an ordinary cast that shows little or no bonding to the backing. Repeated use of these bandages did not result in skin reactions. When a cast was dried for three days and then soaked in water for 24 hours it retained 95 percent of the strength of a cast four days old and not soaked in water. An ordinary cast in this test would retain only 50 to 60 percent of its strength.

EXAMPLE 2.

276 grams of the dry, uncured resin and 75 grams of the pvp of Example 1 were placed into a wide-mouthed glass jar with a tight, screwed-on cover (for example, rubber-gasketed). 15 grams of ammonium chloride (polymerization or condensation catalyst for the resin) were placed in a tightly sealed or tightly wrapped water-soluble film packet (for example water-soluble polyvinyl alcohol film) so as to keep it out of contact with the resin and prevent polymerization of the resin in storage. The packaging was done in a dry atmosphere in order to prevent absorption of moisture by the resin and pvp, and the jar was kept tightly sealed until its contents were used. When ready to use the contents of the jar were dumped into a container of a size to permit complete immersion of the bandage to be used and a jarful (one pint) of tepid water was added and the mix stirred until dissolved. A 4 inch × 5 yd. ordinary bandage (a fast-setting bandage made by the methods, for example, of U.S. Pat. Nos. 3,191,597; 3,282,265; 3,236,232; 3,294,087 or 2,557,083), the excess solution squeezed out (for example, leaving about 35 percent of the weight of the dry bandage of solution) and a cast made according to the above-noted Federal Specification. The set was about five min. and the cast was similar in properties to the cast of Example 1. If the cast is available in a polyethylene envelope, the solution may be poured into the envelope in amount sufficient to wet it thoroughly and the excess returned to its container. If used economically this amount of solution is sufficient to wet about 9–4 inch × 5 yd. or 20–3 inch × 3 yd. bandages. The above procedure makes over 1½ pints of solution which can be used for up to about two hours. Repeated use of this solution failed to elicit any skin reactions.

EXAMPLE 3.

10 parts of the resin and 5 parts of the pvp of Example 1 were dissolved in 35 parts water containing 0.4 part boric acid, 1.5 part aqueous ammonia (29.4% $NH_3$), 1.6 part water emulsion containing 55 percent water-insol-uble polyvinyl acetate (softening-point 200° to 250°F.) and 1.2 part am-monium sulfate. Into this solution were slurried 85 parts of the pop of Example 1. The slurry was coated as before on 32×28 mesh surgical gauze but dried for about 30 minutes in a circulating-air oven at about 115°F. In this case, where the resin is in aqueous solution with a catalyst, the drying must be done at low temperature so as to prevent substantial polymerization of the resin and the final product must be completely dry and kept so in order to prevent polymerization of resin in storage. Casts made from the product gave good strength and water-resistance and repeated use elicited no skin reactions.

EXAMPLE 4.

A slurry was made as in Example 3 except that the ammonium sulfate was omitted from the slurry and the coated gauze could be dried for about 5 minutes at about 230°F. The dry bandage was sprinkled on one surface with a thick slurry of ammonium chloride in melted polyethylene glycol of 1500 average molecular-weight and melting-point 40°C. in proportion to give ammonium chloride in the amount of 12 percent of the weight of resin—the slurry being deposited in the form of separate, small droplets. Casts made with the product were similar to those of Example 1 and no skin reactions were encountered. A methoxy-polyethylene glycol of similar m.p. can be used in place of the polyethylene glycol.

EXAMPLE 5.

A solution was made up containing 102 parts of the resin, 13 parts of the polyvinyl acetate emulsion and 50 parts of the pvp of Example 3, 1.5 parts casein (Argentina acid) and 12 parts ammonium sulfate in 166 parts of the aqua ammonia of Example 3 and 202 parts water. 680 parts of the pop of Example 1 was slurried with this solution after all soluble material was dissolved. The product was coated and dried as in Example 3 and results were similar to those of Example 1.

EXAMPLE 6.

A solution was made up containing 27 parts of the resin, 3.6 parts of the polyvinyl acetate emulsion and 27 parts of the pvp of Example 1 with 82 parts 29.4 percent aqua ammonia, 21 parts water, 3.6 parts potassium sulfate and 3.3 parts ammonium chloride. This solution was slurried with 180 parts of the pop of Example 1 and coated and dried as in Example 3, with results similar to those of Example 1.

EXAMPLE 7.

The procedure of Example 3 was repeated except that 0.8 part high molecular-weight dextran that softens in water but does not readily dissolve, was used in place of the polyvinyl acetate emulsion, as binding agent. This substitution was also made in the procedure of Example 4 with results similar to those of Example 1.

EXAMPLE 8.

The procedures of Examples 5 and 6 were repeated using the dextran of Example 7 in place of the polyvinyl acetate emulsion in amount equal to the solids content of the emulsion. Results were similar to those of Example 7.

EXAMPLE 9.

When the dextran of Example 7 was used as the sole binding agent in either a water-slurry or a slurry-liquid of water, methyl, ethyl or iso-propyl alcohol or toluene or the slurry-liquid of Example 1, it is found that the cast made from such bandages (without pvp or melamine-formaldehyde resin) when dry weighs considerably more than a cast made from bandages of the ordinary type as made by any of the methods of the patents as cited in the above Example 2. It has not been determined exactly why this is but it may be suggested that the dextran combines with some of the excess water to fill up or lessen some of the voids in the cast as it drys and adds some weight with a corresponding increase in strength. Also it is found that the resulting dry cast is more hydrophobic (less water-absorbent) than an ordinary-type cast and thus more water-resistant.

In general all of the bandages of the above Examples aged well at ordinary temperatures when well dried and protected from moisture and they set in 4–5 minutes when wet preparatory to use in making a cast; they lost little plaster when handled dry and when wet and squeezed out to make a cast; casts made from them were strong, water-resistant and irritating and/or allergenic properties were minimal.

Figure 2:
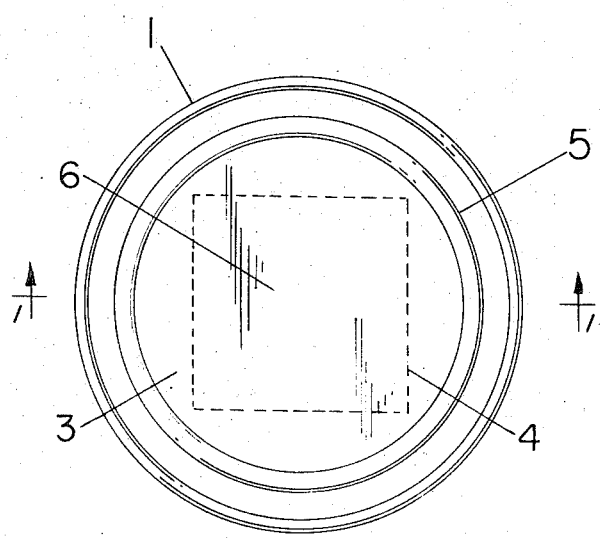

Referring now to the drawings in which, among other things, an illustrative but particularly preferred embodiment of the present invention is shown, FIG. 1 is a vertical section substantially along the line 1—1 of FIG. 2.

Like reference numbers of FIGS. 1 and 2 refer to like parts. This embodiment shows a cylindrical metal can 1 which can be of steel or other metal and may be lined to avoid corrosion if desired, although since the contents must in any case be quite dry in order to prevent polymerization (condensation) of the resin in storage, corrosion is not a serious problem. At 2 is a cover nearly as wide as the can itself, there being a tapered, pressed seal at 5. The resin, preferably in granular form in order to facilitate dissolving without excessive lumping, is at 3. The dry condensation catalyst is at 6, here in the form of a porous cube wrapped with the dry, water-soluble film 4. The polyvinylpyrrolidone may be enclosed in the cube with the catalyst or, if it is completely dry, it may be mixed with the resin and, if so, facilitates dissolving of the resin. The total volume of the can may be 1 pint so as to serve to measure the proper amount of water to add to the 276 grams of the resin after it is transferred to another container in which the bandage can be dipped preparatory to use. Otherwise the can may have a volume of about one quart so that it holds the 1½ pints of solution made by adding one pint of water to the 276 grams of resin and leaves extra volume to contain the solution as the bandage is dipped in the can. In any case, if the latter procedure is used, the mouth of the can must be wide enough to permit insertion of the size or sizes of bandage to be used.

The useful amounts of resin vary between 5 and 20 percent of the weight of pop, with a preference for 10 to 15 percent. The pvp is used in amounts from 10 to 150 percent of the weight of resin, with a preference for 50 to 100 percent. Melamine-formaldehyde resins with mol ratio of melamine to formaldehyde from 1:1.5 to 1:1.33 can be used with a preference of the ratio 1:1.7 to 1:2.5. Plaster set-accelerator (potassium sulfate, ammonium sulfate or zinc sulfate) is used in amount from 0.5 to 2% $K_2SO_4$ equivalent based on weight of pop. Resin polymerization catalyst (ammonium chloride, ammonium sulfate, zinc chloride or aluminum sulfate) is used in amount from 5 to 15 percent of the weight of resin in terms of $NH_4Cl$ equivalent, but the optimum is 2 to 3.5 grams per 4 inch × 5 yd. bandage or from 210 to 240 grams of bandage. The solution of Example 2 should contain 2 percent of its wieght of $NH_4Cl$ equivalent but may vary from 1 to 5 percent. Ammonium sulfate is less active than ammonium chloride but gives better aging of the resin when in contact therewith. When non-aqueous slurry liquid is used one can use a mixture of ammonium sulfate and potassium chloride which, when wet is the same as ammonium chloride and potassium sulfate, the former being a good polymerization catalyst and the latter a good plaster set-accelerator, and the mix in contact with dry resin gives better stability. Similarly a mixture of zinc chloride and ammonium sulfate can be used.

Other non-aqueous slurry-liquids can be used such as methanol, ethanol, propanol, isopropanol or the monomethyl or monoethyl ether of ethylene glycol. It is desirable to use a liquid that at least softens if not dissolves the resin and, except in the case of the polyvinyl acetate dispersion (emulsion) the binder should dissolve or at least soften in the liquid. Dextran is useful in this regard since it softens in water, alcohols (as listed above) and also in hydrocarbons like toluene. As a matter of fact polyvinyl acetate functions well when dissolved or softened in a solvent, containing monomethyl or monoethyl ether of ethylene glycol, in which it is soluble or softenable, as used in Example 1. Of these monoethers one uses 10 to 30 percent in an inert, volatile liquid hydrocarbon. Or one can use 10 to 40 percent water in one of the alcohols listed above, pvp also is soluble in water and the above-listed monoethers and alcohols but not in hydrocarbons alone; however it is not necessary that it be dissolved in the slurry-liquid aside from the standpoint of uniformity of the slurry.

Thus the use of pvp minimizes the irritating and sensitizing properties of melamine-formaldehyde resins and other ingredients of pop casts. pvp of average molecular-weight 40,000 is preferred although material in the range from 10,000 to 360,000 can be used.

In general I may use the procedures of the above-mentioned patents of Foglia et al and Billings et al, except with the addition of pvp as herein disclosed. Although I prefer the pop described in my Example 1, I may also use low-density, high-consistency pop that is made by calcining gypsum in a kiln. In order not to show a gritty feel, the pop should be at least as fine as to pass a 100 mesh U.S.Standard screen and the set-accelerator and catalyst should also be this fine. The resin, in order to dissolve quickly should have particles in the range of 1 to 25 microns and preferably 1 to 5 microns in size. While there is some advantage from the standpoint of its bonding action, it is not necessary for the resin to dissolve in the slurry. A thorough mixture of finely-divided resin, pop, pvp and plaster set-accelerator will function as long as an adequate binder is present.

The water-soluble film as used in Example 2 can be 85 to 90 percent hydrolyz-ed polyvinyl acetate with a molecular-weight not over that indicated by its viscosity in 4 percent aqueous solution at 20°C. of 48 centipoises as determined by the Hoeppler falling-ball method. If the percent hydrolysis is as high as 98 percent, the viscosity should not be over 6 cps. The package used in this Example can be a glass or metal jar with a moisture-vapor-tight cover or it can be a water-vapor-proof envelope of plastic (polyethylidene chloride—"-Saran", aluminum or steel foil or thicker polyethylene, polypropylene, polyvinyl chloride or 99 to 100 percent hydrolyzed polyvinyl acetate of 60 to 70 cps. as above determined). If the jar is to be used to measure the water for the solution, it should hold 453 parts water for 276 parts resin. The packet of catalyst can, of course, be separated from the resin by any obvious means but it is very convenient to tightly wrap or seal it in a water-soluble film so that the whole contents of the package including catalyst and its wrapper may be emptied out and dissolved in the water.

The binding-agent is used in from 0.5 to 1.5 percent of the weight of pop in the bandage and includes polyvinyl acetate emulsion, polyvinyl acetate dissolved in a solvent, dextran, dextrin, cooked starch or cold-water-insoluble, hot-water-soluble polyvinyl alcohol (see U.S.Patent application, Ser. no. 42,446 by Smith). The starch is prepared by cooking at near the normal boiling-point in part or all of the water to be used in the slurry. Dextrin is dissolved in hot water (180°–212°F.). Polyvinyl alcohol is dissolved in hot water and the dextran is merely dissolved in the slurry-liquid (toluene, alcohol, mono-ether of ethylene glycol or water). Polyvinyl acetate emulsion or dextran is used in any of the formulations herein given-the others are used in water slurry. Dextran is made by the action of certain enzymes on sucrose and the material of different solubilities is obtained by fractionation.

As backing material normally 32×28 mesh surgical gauze is used but any flexible, porous, inert, preferably water-wettable material may be used. In order to increase the rate of wetting of a bandage-roll— and also to reduce dusting of the dry bandage— there may be used in the slurry 0.05 to 0.15 percent of the weight of pop of a wetting-agent such as sodium lauryl sulfate or sodium alkyl naphthyl sulfonate; or 0.1 to 1 percent, preferably 0.5 percent of water-soluble polyethylene glycol (Carbowax), methyl cellulose, hydroxyethyl ethyl cellulose or hydroxypropyl methyl cellulose.

It should be emphasized that the melamine resin should be very dry and if the pvp is to contact it in storage, it should likewise be very dry if good aging is to be had. In the mix as in Example 2, if the pvp is not perfectly dry, it can be enclosed with the catalyst or added separately to the solution at the time of use. In addition to the catalysts mentioned other acid-reacting materials such as zinc sulfate that will give a solution Ph of 6 or below, will function.

With further respect to the action of pvp in reducing irritating and sensitizing properties, I have discovered that even in amounts from 5 to 25 percent in soaps, shampoos and detergents it is effective; for example, in soaps used almost daily by surgeons in scrubbing their hands which become very sensitive and irritated and in shampoos which irritate the eyes. In respect to dextran, it is of course very acceptable physiologically, having been successfully used in solution in water in its more readily dispersable form as a blood volume extender. As a plaster of Paris bandage bonding-agent, as indicated, the less readily dispersable forms are effective in bonding the plaster as the bandage is wet, but the more readily dispersable forms, especially in combination with cooked starch and/or dextrin as used in water or aqueous ammonia slurries show acceptable bonding action and exhibit the above-mentioned increased weight, strength and water-resistance of casts.

Having thus described my invention, what I claim is:

1. A combination package adapted to preparation of a dipping-solution in which to wet plaster of Paris bandages in order to make them capable of use to form strong, hard, waterproof, firmly-bonded casts; said package comprising the approximate proportions of: (1) 276 parts by weight of dry, uncured melamine-formaldehyde resin made with a molecular ratio of from 1:1.5 to 1:2.5 melamine to formaldehyde, respectively; (2) a polymerization catalyst in amount from 10 to 25 parts by weight and selected from at least one of the acidic salts in the class consisting of ammonium chloride, ammonium sulfate, zinc chloride and aluminum sulfate, said catalyst being separated from said resin and enclosed by a dry, inert, water-soluble film; (3) polyvinyl pyrrolidone in amount from 10 to 150 percent of the weight of said resin and of molecular-weight between 10,000 and 360,000; the materials of parts (1), (2) and (3) being enclosed in a water-vapor-proof container with a wide-mouthed tightly-sealed cover and of a size to hold 453 parts by weight of water.

2. The package of claim 1 wherein the said container is a sealed envelope made of a water-vapor-proof film selected from the class consisting of plastic and metal foil.

3. The package of claim 1 wherein the said water-soluble film is selected from the class consisting of 85 to 90 percent hydrolyzed polyvinyl acetate of molecular-weight not over that represented by its viscosity in 4 percent by weight aqueous solution at 20°C. of 48 centipoises as determined by the Hoeppler falling-ball method and 90 to 98 percent hydrolyzed polyvinyl acetate with a similarly determined viscosity of not over six centipoises, the minimum molecular-weight being high enough to yield a strong film.

4. A physiologically acceptable mix for use in preparing a dipping solution in which to wet plaster of Paris bandages in order to make them capable of use to form strong, hard, water-resistant, firmly-bonded casts; said mix comprising: (1) a dry, uncured melamine-formaldehyde resin with a molecular ratio of melamine to formaldehyde of from 1:1.5 to 1:2.5 and (2) dry polyvinylpyrrolidone of molecular-weight between 10,000 and 360,000 in amount from 10 to 150 percent of the weight of resin; said mix being packaged in a moisture-vapor-proof container and when used being dissolved in water with an acid-reacting catalyst selected from at least one of the class consisting of ammonium chloride, ammonium sulfate, zinc chloride and aluminum sulfate, in amount from 1 to 5 percent of the weight of resin solution.

5. The mix of claim 4 wherein the molecular-weight of said polyvinyl pyrrolidone is an average of 40,000.

* * * * *